United States Patent [19]

Warmuth, II et al.

[11] Patent Number: 4,741,517
[45] Date of Patent: May 3, 1988

[54] AIR SPRING WITH EXTENSIBLE FABRIC RESTRAINING CYLINDER

[75] Inventors: Ivan J. Warmuth, II; Thomas E. Burkley; Christian H. Hershberger, all of Akron, Ohio

[73] Assignee: The Goodyear Tire & Rubber Company, Akron, Ohio

[21] Appl. No.: 910,902

[22] Filed: Sep. 24, 1986

[51] Int. Cl.⁴ .................... F16F 9/04; F01B 19/04
[52] U.S. Cl. ................ 267/64.24; 92/103 F; 267/64.27
[58] Field of Search .......... 267/64.19, 64.21, 64.24, 267/64.27, 8 R, 35, 63 R, 148, 149, 152, 153, 64.23, 217, 256; 188/298; 92/98 D, 99, 103 F, 103 SD; 280/708, 711

[56] References Cited

U.S. PATENT DOCUMENTS

| | | | |
|---|---|---|---|
| 2,925,265 | 2/1960 | Nassimbene | 267/64.24 |
| 2,939,698 | 6/1960 | Polhemus | 267/64.24 |
| 3,010,715 | 11/1961 | Slemmons | 267/64.24 |
| 3,033,558 | 5/1962 | Slemmons et al. | 267/64.24 |
| 3,043,582 | 7/1962 | Hirtreiter | 267/64.27 X |
| 3,074,709 | 1/1963 | Ballard et al. | 267/64.21 |
| 3,438,309 | 4/1969 | Boileau | 267/64.24 X |
| 3,582,027 | 6/1971 | Hackbarth | 248/550 |
| 3,815,885 | 6/1974 | Moulton et al. | 267/64.23 |
| 4,332,397 | 6/1982 | Steger | 267/15 A X |

FOREIGN PATENT DOCUMENTS

| | | | |
|---|---|---|---|
| 2064751 | 8/1972 | Fed. Rep. of Germany | 267/64.27 |
| 0046308 | 8/1963 | Japan | 267/64.27 |

Primary Examiner—Duane A. Reger
Assistant Examiner—Robert J. Oberleitner
Attorney, Agent, or Firm—M. R. Dion, Sr.

[57] ABSTRACT

There is disclosed a rolling lobe fluid spring (10) having a rigid end cap (12) and a piston (14) with a generally tubular air impervious flexible membrane (18) sealingly attached thereto to form the air spring. A fabric restraining cylinder (40) is provided circumferentially around the outer periphery of the flexible membrane. The cylinder is composed of at least two layers of fabric (41, 42) having primary cord reinforcements oriented at opposite bias angles such that the cylinder (40) is radially extensible and supports the rolling lobe (32) of the air spring. It also radially supports the flexible membrane (18) over the axial working stroke (WA).

8 Claims, 3 Drawing Sheets

AIR SPRING WITH EXTENSIBLE FABRIC RESTRAINING CYLINDER

This invention relates to improved air springs or pneumatic suspension devices for use in automobile and other vehicle suspension systems. In particular the invention relates to air springs of the rolling lobe or sleeve type configuration in which the flexible membrane of the air spring rolls over a piston during the axial stroke of the air spring.

The flexible membrane of rolling lobe air spring is required to withstand the hoop stresses associated with the internal pressure of the air spring. In general, the greater the internal pressure required of the air spring, the heavier the fabric gauge that is required to withstand the stress. As the thickness of the flexible membrane of the air spring increases the flex fatigue life of that membrane in the area of the rolling lobe meniscus decreases significantly. Most failures in service of a rolling lobe type air spring occur in the area of the flexible member which rolls upward and downward over the formed surface of the piston.

Rigid restraining cylinders surrounding the flexible membrane which are attached to the upper retainer or cap of the air spring configuration are well-known. These rigid retainers are made of metal or plastic and generally serve to absorb the radial hoop stresses exerted on the air spring flexible member by constraining its radial growth during pressurization. These rigid restraining cylinders have several drawbacks. The accommodation of any degree of arcuate action or lateral motion requires complex fastening methods. The rigid restraining cylinders increase the potential of abrasion and wear fatigue of the flexible membrane of the air spring at the contact surface. Further, the rigid metal or plastic restraining cylinders can trap debris between the elastomeric or rubber reinforced flexible member and the inner peripheral surface of the rigid restraining cylinder causing aggravated abrasion and premature failure of the flexible membrane. In addition, stone impingement on the metal restraining cylinder can crack or dent the cylinder which may result in catastrophic damage to the flexible member of the air spring.

An object of this invention is to provide a fabric reinforced elastomeric restraining cylinder which will not sustain the damage associated with rigid restraining cylinders. A further object is to provide an air spring assembly which is resistant to accumulation of debris between the restraining cylinder and the flexible membrane of the air spring. Yet another object is to thermally insulate the flexible membrane of the air spring from heat sources in an automotive application such as exhaust manifolds and general engine heat. An advantage of the invention is that the fabric reinforced elastomeric restraining cylinder works against the elastomeric flexible membrane of the air spring to break loose and dislodge any debris which may become entrapped between the restraining cylinder and the flexible membrane during service. The axial travel of the air spring during full jounce and rebound will expel any such debris during normal service and operation of the air spring. A further advantage of the elastomeric restraining cylinder is that arcuate or lateral motion of the air spring travel is accommodated. This is of particular advantage in an automotive strut or suspension member application. The restraining cylinder allows limited contact with the A-arm of the suspension without damage to the integrity of the air spring.

A feature of the invention is that the reinforced fabric restraining cylinder is built using a plurality of layers of bias laid fabric in which the major reinforcement cords are set at angles to the centerline of the tubular sleeve. This bias construction allows for a limited and specifically controlled amount of radial extensibility during fully inflated operation of the air spring. This ability to radially deform to a limited extent serves to reinforce the flexible member of the air spring against radial hoop stresses. In addition, the rolling lobe meniscus portion of the air spring is partially encapsulated due to the radial contraction of the bias built fabric restraining cylinder around the radially outer part of the meniscus. This cradling of the meniscus reduces stress in a critical portion of the rolling lobe air spring. A further advantage of the air spring of this invention is that the overall modulus of the restraining cylinder results in less fluctuation of the air spring internal pressure over the load range. The dynamic flexibility, which is defined as the relationship between the spring rate or stiffness of the air spring versus frequency of the oscillation, is improved over an air spring utilizing a rigid metal or plastic restraining cylinder.

Other objects, features and advantages will become apparent from the following description of the invention.

BRIEF DESCRIPTION OF THE INVENTION

An embodiment of the invention is a rolling lobe air spring having an axis and an axial stroke, said air spring comprising (a) a rigid end cap: (b) a piston axially spaced apart from said rigid end cap having an outside peripheral surface: (c) a flexible membrane, said membrane being sealingly attached around said end cap on one end and around said rigid piston on a second end to form a working cavity therebetween, said flexible membrane forming a meniscus as the piston moves axially relative to said rigid end cap over said axial stroke of said air spring, said flexible membrane assuming an unrestrained inflated diameter when said working cavity is pressurized: and a fabric restraining cylinder attached at one end to said rigid end cap and extending coaxially with said flexible member from said end cap over the axial stroke of said air spring, said fabric restraining cylinder being formed of at least two adjacent layers of fabric having primary reinforcement cords with cords oriented at opposite bias angle relative to said axis in each adjacent layer of fabric, and being extensible in the radial direction and having an unstretched diameter less then said inflated diameter of said flexible membrane, thereby restraining the radial expansion of said flexible membrane when said working cavity is pressurized, said fabric restraining cylinder radially contracting to said unstretched diameter to substantially conform to a radially outward portion of said meniscus of said flexible membrane as the air spring moves through said axial stroke, thereby providing radial support to said flexible membrane and radial and axial support to said portion of said meniscus.

DETAILED DESCRIPTION OF THE INVENTION

Figure 1:
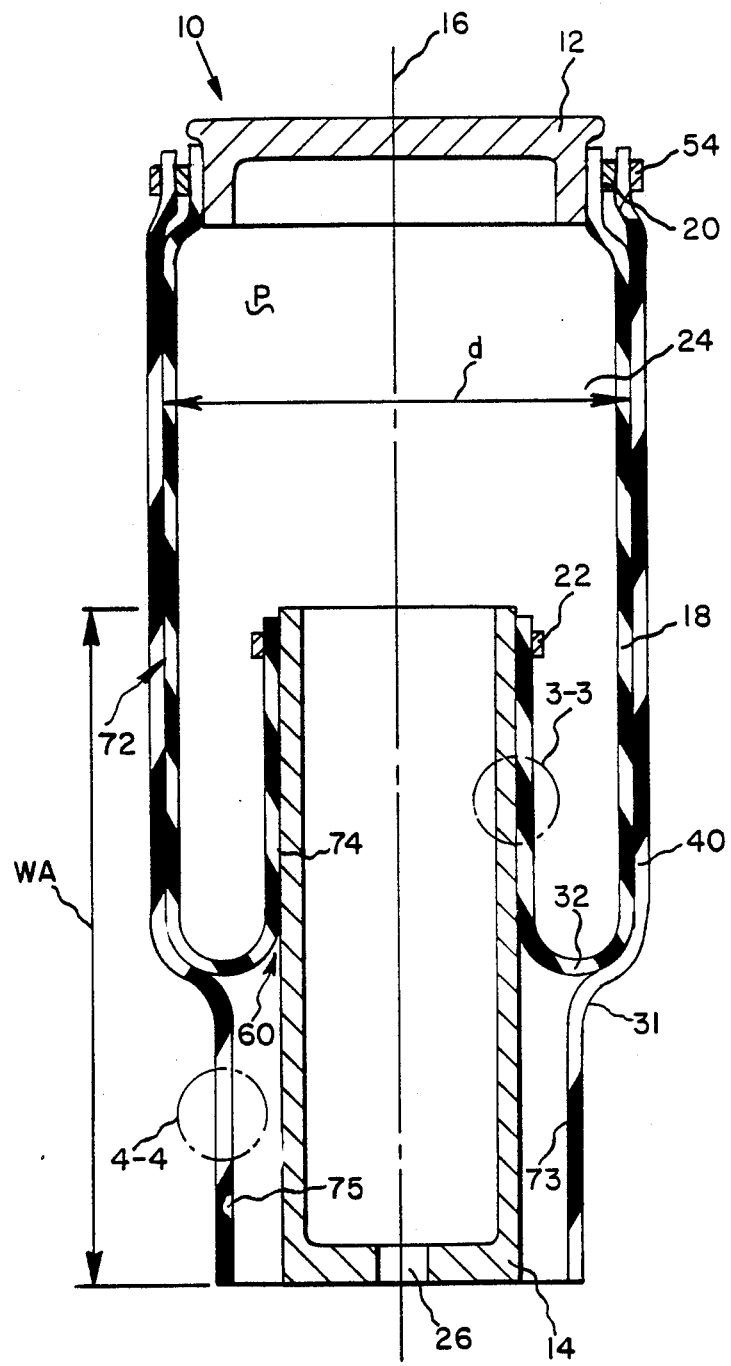
FIG. 1 is an axial cross-section of an air spring of the invention showing the fabric restraining cylinder.
Figure 3A:
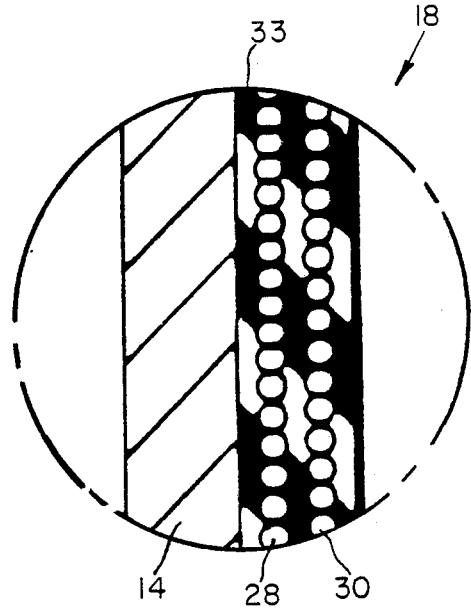
FIG. 3A is an enlarged portion of FIG. 1 taken at 3—3 showing the inner construction of the flexible membrane.

FIG. 1 illustrates a simple form of the invention in which an air spring 10 is composed of a cap 12, a piston 14, which are spaced apart axially along the axis of movement 16 of the air spring 10. Sealingly attached between the piston 14 and the cap 12 is a conventional flexible membrane 18 which is air tightly attached to the cap 12 and the piston 14 by any conventional means such as clamp rings 20 and 22 to form a pneumatic working cavity 24 therebetween. All of the elements of the air spring described to this point are well-known in the art and a detailed description of the manner in which such rolling lobe or sleeve-type air springs can be made and used is contained in U.S. Pat. Nos. 3,043,582 to Hirtreiter and 3,897,941 to Hirtreiter and Kluss, both of which are herein incorporated by reference. It is apparent that when the conventional air spring as described to this point is pressurized to its intended working pressure by introducing pressurized air through channel 26 that the flexible member 18 must absorb all the level of internal pressure P in working cavity 24. The flexible membrane 18 achieves an equilibrium inflated diameter d through the pantographing of the bias-laid fabric reinforcements 28 and 30 shown in FIG. 3. The fabric is preferably of cord-type fabric in which the primary strength cords 29, 31 are embedded in a matrix 33 of rubber or elastomer. The cords are laid at a bias angle 25, 27 to the axis 16 of the airspring, generally at opposite angles for each successive fabric layer. Angles 25, 27 are illustrated as measured from an imaginary line 23 which is parallel to axis 16 and lies in the plane of the surface of the membrane 18. The necessity of designing the flexible membrane 18 to be capable of withstanding the hoop stresses from the internal working pressure of the working cavity 24 requires an appropriate selection of heavyweight fabrics and rubber elastomer for coating the fabrics in order to withstand the internal pressures. The heavy fabrics and relatively stiff rubber compounds tend to be counterproductive to minimization of heat buildup or hysteresis of the working area of the flexible member which rolls up and down the outer periphery of the piston 14 to form the meniscus 32. The meniscus 32 is the characteristic shape of a rolling lobe or sleeve-type air spring when in its inflated and working condition. The flex life of the fabric in this critical working area WA of the flexible membrane 18 is generally compromised by the need to have heavy fabrics and relatively stiff rubber compounds to withstand the hoop stresses. The axial range of the working area WA is also called the axial stroke of the air spring. The fabric restraining cylinder must extend downward from the Cap 12 over the entire axial stroke to effectively restrain the flexible membrane 18.

Figure 4A:
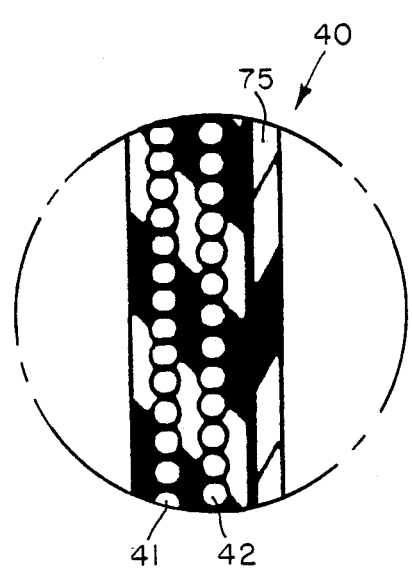
FIG. 4A is an enlarged portion of FIG. 1 taken at 4—4 showing the inner construction of the fabric restraining cylinder.

The air spring of this invention adds a critical additional element to the conventional air spring rolling lobe construction by inclusion of a full-length fabric restraining cylinder 40. The fabric restraining cylinder 40 is manufactured as shown in FIG. 4 by building up two layers of cord or cord fabric 41 and 42. The primary reinforcement cords are arranged at a predetermined bias angle 45, 47 relative to an imaginary longitudinal line 49 parallel to the axis 16 of the air spring 10 of the fabric restraining cylinder. By way of example, the bias cord angle 45 selected may be 62° for the primary strength cords of fabric layer 41 while layer 42 would be applied over layer 41 such that the bias angle 47 of the primary strength cord would be a minus 62° relative to the line 49. It should be understood that the measurement relative to the line 49 is fully equivalent to the angle formed with axis 16. This cord angle of 62° can be laid-up on a building mandrel into a tubular cylinder of a predetermined diameter such as 95 millimeters. The fabric layers 41 and 42 are embedded in a rubber matrix 43 prior to their application to the building mandrel. Such fabric layers can be easily made by conventional calendering or other suitable methods for embedding relatively thin layers of rubber into the fabric. During operation of the finished air spring, this 95 millimeter cylinder will come to an equilibrium diameter d of about 110 millimeters.

The fabric restraining cylinder 40 is built and designed in similar manner to the flexible membrane 18 of the air spring except that the selection of fabric and elastomer properties can be made to optimize the resistance of the cylinder 40 to heat and abrasion. The bias cord angle of the fabrics 41 and 42 is selected to obtain the inflated diameter d of the flexible member 18.

The bias fabric construction of the fabric restraining cylinder 40 allows for limited radial expansion of the cylinder 40 during full pressure operation of the air spring. The degree of radial expansion of the cylinder 40 must be less than the normal operating radial expansion of the flexible membrane 18 of the air spring in order to provide radial restraining support for the membrane 18. This ability to absorb a portion of the hoop stresses or radially directed vectors of internal pressure allows the air spring designer the flexibility of utilizing light gauge bias fabrics in the membrane 18; thereby maximizing the flexing ability, minimizing heat buildup or hysteresis and improving cold temperature flex-properties. Without the fabric restraining cylinder 40 to absorb the hoop stresses, the membrane 18 must be designed to carry the full stress, both radially and axially, that is provided by the internal pressure P during operating conditions of the air spring. This requires the use of heavier fabrics and relatively stiff rubber compounds. Both heavier fabric and stiff rubber compounds are detrimental to the flex life and hysteresis or heat buildup characteristics of the flexible membrane 18 during long term full, pressure service of the air spring. The fabric restraining cylinder 40 deforms radially inwardly during the stroke of the air spring as it moves axially upward and downward over the working area WA of the piston 14. This forms a concave indentation 31 axially below the meniscus 32. The partial encapsulation or shrouding of the radially expansible fabric restraining cylinder 40 provides critical support for the meniscus 32 of the rolling lobe portion of the flexible membrane 18. This shrouding effect reduces the axial and radial stress in the meniscus 32 of the rolling lobe and improves protection of the meniscus area from weathering and road debris. The presence of the radially expansible fabric restraining cylinder surrounding the periphery of the flexible membrane 18 results in a more constant internal pressure over the air spring load range.

A further advantage of the radially expansible fabric restraining cylinder 40 is that it simplifies the design of the end cap 12 by allowing the attachment of the fabric restraining cylinder 40 at approximately the same radial diameter as the flexible membrane 18. This characteristic derives from the design of the cylinder 40. It has a lesser radial diameter when it is not subjected to internal pressure or radially directed force. This relatively uniform diameter end cap configuration improves the space efficiency of the air spring in critical space applications such as automotive suspension components. The fabric envelope may be attached to the cap 12 by any suitable clamp 54. A swage ring is a representative example. Of course, the flexible membrane and/or the cylinder 40 may be provided with circumferential beads as is commonly known in the art and attached to suitable designed caps and pistons by conventional bead attachment technology. The embodiments shown in FIGS. 1 and 2 use swage ring attachment methods as such methods are economical and the flexible membrane 18 and cylinder 40 can be built using simple building techniques which do not involve forming a bead.

Type of fabric used in layers 41 and 42 as well as in the flexible membrane 18 can be of any type known to be useful in air springs and/or tire fabric constructions. The preferred type of fabric utilizes a primary strength cord in one direction and a lesser strength yarn in the perpendicular or complimentary direction to hold the primary strength cord in its desired parallel orientation. Such fabrics are well known in air spring and tire technology. The cord should preferably be of a material which is highly flexible and of high tensile strength as well as low extensibility or stretch. Polyester, aromatic polyamides, nylon or steel wire are suitable materials for the cords.

The interface 72 between the flexible membrane 18 and the fabric restraining cylinder 40 is a surface which is subject to frictional wear and heat build-up during cycling of the airspring through its axial stroke. The rubber covered fabrics at the interface 72 tend to rub together during service. In a preferred embodiment of the invention, the inner peripheral surface 73 of the fabric restraining cylinder and/or the outer peripheral surface 74 of the flexible membrane are specially treated to create a low coefficient of friction surface 75. This may be accomplished by compounding of the rubber or treatment of the surface after manufacture of the rubber fabric. Alternative methods include:

(1) inclusion of lubricating agents in the rubber compounds which exude to the surface during use;

(2) inclusion of built-in lubricants such as Teflon TM or various thermoplastic resins in the rubber compound of the fabric layers;

(3) halogenation of the outer surface by chlorine or bromine to create a velvet-like surface on the cured rubber surface; and/or (4) post manufacture application of a tough, low coefficient of friction coating made from materials such as a polyamide, polyester, polyurethane or polyvinyl halide may be useful as base materials. Suitable compounding of additional ingredients and pre or post treatment of the substrate with primers and curatives may be desirable. Good adhesion to the substrate is essential.

Figure 2:
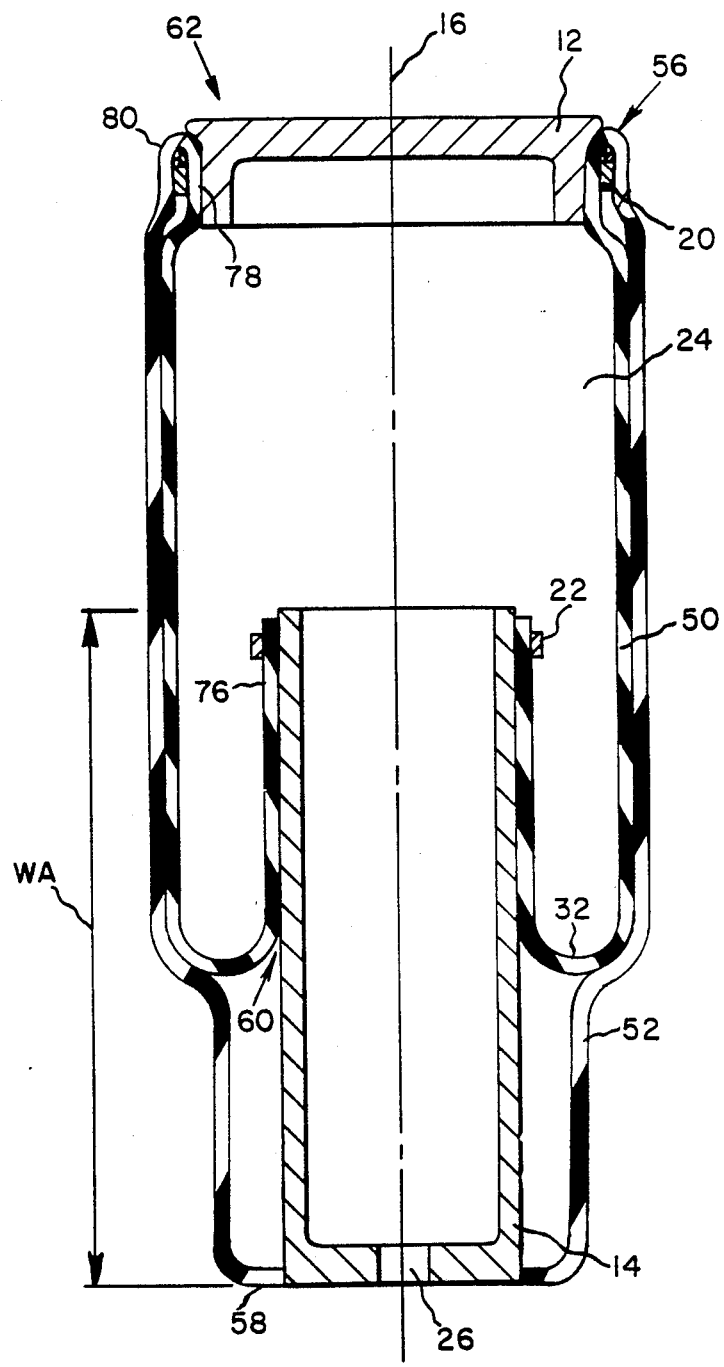
FIG. 2 is a cross section view of another embodiment having a dirt shield and a coextensive sleeve of the flexible membrane and the fabric restraining cylinder.

A preferred method of creating a low coefficient of friction surface 75 involved the steps of: building the rubber covered, fabric restraining cylinder; curing the structure; cleaning the surface; coating the cured neoprene rubber surface with a suitable primer, preferably a polyurethane; applying a sprayable 2 component polyurethane coating to the inner surface of the fabric restraining cylinder allowing the polyurethane coating to fully polymerize; then assembling the airspring as shown in FIGS. 1 and 2.

The preferred material for the low coefficient of friction surface 75 should have a modulus similar to the rubber to which it is bonded and be capable of a strong adhesive bond to the rubber surface. Preferred materials are the polyester or polyether urethanes such as those supplied by Goodyear under the trademark Neothanem TM. A most preferred material is a polycaprolactone/isopherone diisocyanate (IPDI) prepolymer cured with isopherone diamine (IPDA).

A more preferred form of the invention is shown in FIG. 2 in which the conventional components of the air spring 62 are identical to FIG. 1. However, the flexible membrane 50 and the fabric restraining cylinder 52 are coextensive with each other through the area of the cap 12 where the clamp ring 22 attaches the flexible membrane 50 airtightly to the cap 12. This coextensible membrane 56 is a unique configuration. It is understood that the clamping mechanism being utilized for the fabric restraining cylinder does not require that the junction be airtight and pressure resistant. This is, of course, due to the fact that the fabric restraining cylinder 52 does not directly come into contact with the pressurized fluid inside of the working cavity 24 of the air spring 62. The constructional details of cylinder 52 are identical to cylinder 40 of FIG. 4 and membrane 18 of FIG. 3 and flexible membrane 50.

An optional feature of the invention shown in FIG. 2 is a flexible dirt shield 58 which is coextensively molded or attached to the fabric restraining cylinder 52 and contiguous with the piston 14. It affords protection from dirt, debris and ice which may accumulate on the piston to meniscus interface 60 and adversely affect the service life of the air spring 62 of FIG. 2. The dirt shield 58 is especially useful when the air spring 62 is used in conjunction with other hydraulic damping means in a strut or major suspension member of a vehicle suspension. In these applications, the piston 14 may actually be the exterior shell of the hydraulic shock absorber in an air strut or suspension member.

Figure 3B:
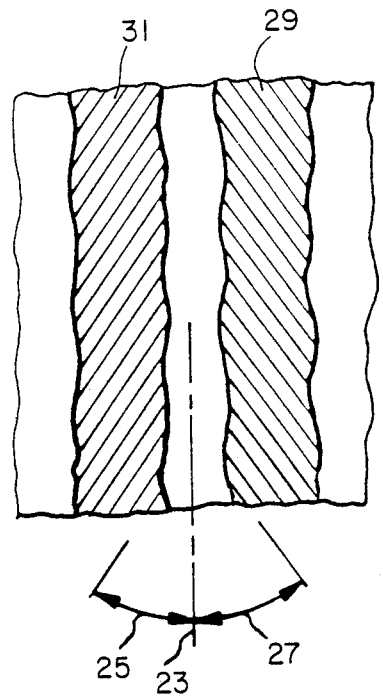
FIG. 3B is a side view of the cross section of FIG. 3A in cutaway from to show the various layers.
Figure 4B:
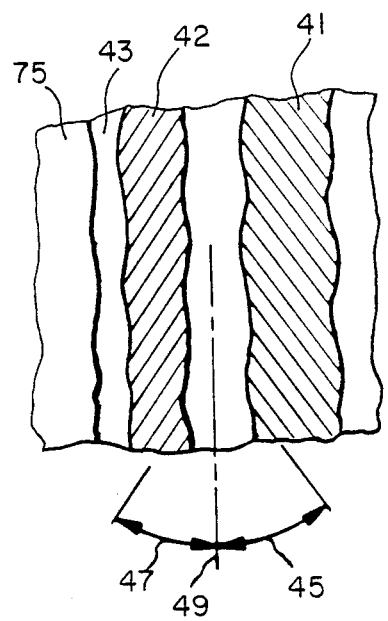
FIG. 4B is a side view of the cross section of FIG. 4A in cutaway form to show the various layers.

Referring now to FIGS. 1, 3B, 4B, the bias angles 45, 47 for the fabric layers of the fabric restraining cylinder 52 are generally greater angles then the bias angles 25, 27 for the flexible membrane 18 of the air spring. This relationship results from the necessity for the flexible member to be more expansible than the cylinder under similar pressures.

The lesser diameter end 76 of the membrane is attached during the assembly of the air spring to the piston by clamp ring 22. The greater diameter end 78 includes the radially extending dirt shield 58 which grazingly contacts the piston 14 during the stroke of the air spring. The transition zone 80 between the fabric restraining portion 52 and the flexible membrane 50 is the area that is fixed to the cap 12 by clamp ring 20.

Preferred embodiments of the invention have been shown and described for illustrative purposes. It will now become apparent to those skilled in the art that various changes to the form and detail may be made without departing from the scope of the invention. Accordingly, the scope of the invention is set forth in the following claims.

What is claimed is:

1. A rolling lobe air spring having an axis and an axial stroke, said air spring comprising:
   (a) a rigid end cap;
   (b) a piston axially spaced apart from said rigid end cap having an outside peripheral surface;
   (c) a flexible membrane, said membrane being sealingly attached around said end cap on one end and around said rigid piston on a second end to form a working cavity therebetween, said flexible membrane forming a meniscus as the piston moves axially relative to said rigid end cap over said axial stroke of said air spring, said flexible membrane assuming an inflated diameter when said working cavity is pressurized; and
   (d) a fabric restraining cylinder attached at one end to said rigid end cap and extending coaxially with said flexible member from said end cap over the axial stroke of said air spring, said fabric restraining cylinder being formed of at least two adjacent layers of fabric having primary reinforcement cords which cords oriented at opposite bias angles relative to said axis in each adjacent layer of fabric, and being extensible in the radial direction and having an unstretched diameter less then said inflated diameter of said flexible membrane, thereby restraining the radial expansion of said flexible membrane when said working cavity is pressurized, said fabric restraining cylinder radially contracting to said unstretched diameter to substantially conform to a radially outward portion of said meniscus of said flexible membrane as the air spring moves through said axial stroke, thereby providing radial support to said flexible membrane and radial and axial support to said portion of said meniscus.

2. An air spring according to claim 1 further comprising a flexible dirt shield attached to said fabric restraining cylinder at an end of the cylinder distal said first end and extending radially inward to contact said outside peripheral surface of said piston.

3. An air spring according to claim 1 wherein said layers of said fabric restraining cylinder are encased in a matrix of rubber.

4. An air spring according to claim 1 wherein said flexible membrane comprises at least two adjacent layers of fabric having primary reinforcement cords which are oriented at a reinforcement angle relative to said axis and wherein said bias angle of said layers of fabric of the fabric restraining cylinder are of greater angularity than said reinforcement angles of said flexible membrane thereby providing radially restraining force on said flexible membrane during operation of said air spring.

5. An air spring according to claim 1 wherein said fabric restraining cylinder and said flexible membrane are coextensive and integrally formed as a single sleeve such that said first end of said fabric restraining cylinder is integrally joined at a junction with said one end of said flexible membrane, said junction being sealably attached to said rigid end cap.

6. An airspring according to claim 1 further comprising: a low coefficient of friction layer on the inner peripheral surface of the fabric restraining cylinder covering at least the portion of the cylinder axially corresponding to said axial stroke of the airspring, thereby minimizing friction between said fabric restraining cylinder and said flexible membrane.

7. An airspring according to claim 6 wherein said low coefficient of friction layer is a polyurethane.

8. An airspring according to claim 7 wherein said polyurethane is a polycaprolactone/isopherone diisocyanate prepolymer cured with isopherone diamine.

* * * * *